United States Patent [19]

Pluequet et al.

[11] 3,817,224
[45] June 18, 1974

[54] DEVICE FOR CONTINUOUSLY CONTROLLING A SPEED-DEPENDENT FACTOR

[75] Inventors: Heinz Pluequet; Armin Reske, both of Cologne, Germany

[73] Assignee: Klockner-Humboldt-Deut Aktiengesellschaft, Cologne, Germany

[22] Filed: Feb. 15, 1972

[21] Appl. No.: 226,628

[30] Foreign Application Priority Data
 Feb. 16, 1971  Germany............................ 2107211

[52] U.S. Cl............ 123/41.15, 417/286, 123/41.29
[51] Int. Cl.............................................. F01p 5/14
[58] Field of Search........... 123/41.15, 41.29, 41.47; 417/6, 63, 286, 426

[56] References Cited
UNITED STATES PATENTS
2,655,109  10/1953  Walker............................. 417/286

Primary Examiner—Manuel A. Antonakas
Assistant Examiner—R. H. Lazarus
Attorney, Agent, or Firm—Walter Becker

[57] ABSTRACT

Method of and apparatus for continuously checking a speed-dependent factor, especially for use in connection with internal combustion engines, according to which the speed-dependent factor to be checked is continuously compared with a second speed-dependent factor having a characteristic similar to that of the speed-dependent factor to be checked. When the difference between the two speed-dependent factors exceeds a predetermined value, a differential measuring system gives off a warning signal or stops the operation of the circuits alltogether.

11 Claims, 6 Drawing Figures

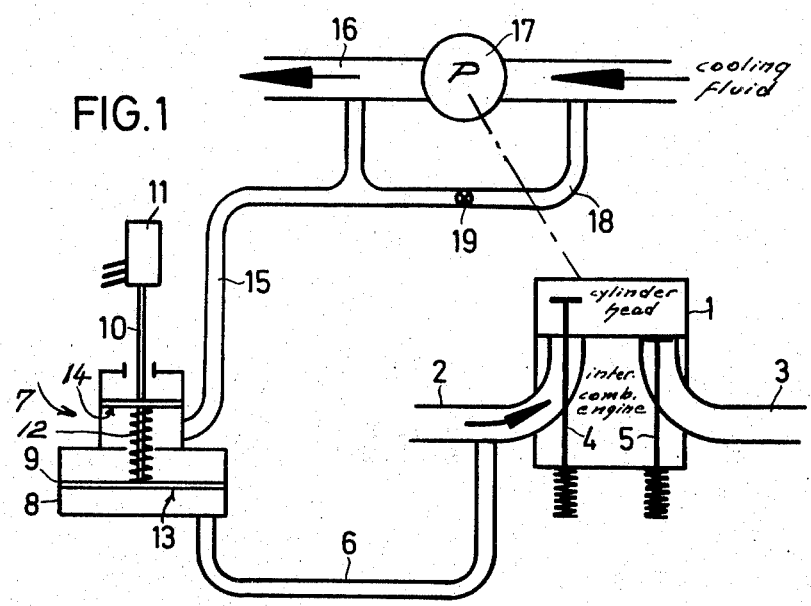
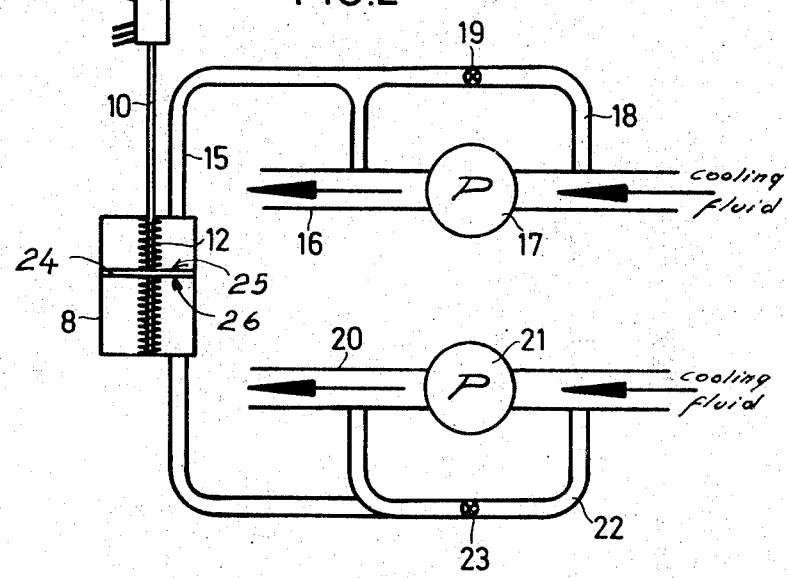

DEVICE FOR CONTINUOUSLY CONTROLLING A SPEED-DEPENDENT FACTOR

The present invention relates to a device for continuously checking and controlling a speed-dependent factor, especially of auxiliary units of an internal combustion engine.

The ever advancing automation requires to an ever increasing extent a continuous checking and control of machine functions. This applies in particular to operations which are service-free for a longer period. Some bureaus of standards therefore require for a periodic service-free operation of water cooled internal combustion engines that the pressure of the circulating water and the pressure of the water in the pipes be continuously checked and that in case of a pressure loss a control device be employed with three stages for warning, for adding the reserve pump, and for turning off of the installation. Inasmuch as the pressure of the pump for the cooling water is a function of the speed and since, depending on the respective load conditions, for a sufficient cooling always a minimum quantity of water must be available, the customary control installations are not sufficient which respond when the pressure drops below a predetermined minimum pressure.

It is, therefore, an object of the present invention to provide a device for continuously checking and controlling speed-dependent factors over the entire range of operation and in response to predetermined deviations from the normal characteristic to actuate an alarm or warning system.

This object and other objects and advantages of the invention will appear more clearly from the following specification in connection with the accompanying drawings, in which:

FIG. 1 diagrammatically illustrates a device according to the invention in which the pressure of a cooling fluid circuit causes the pressure in the suction line of an internal combustion engine to actuate a differential measuring system.

FIG. 2 shows a device according to the invention in which a differential measuring system is actuated by the cooling fluid pressure of two cooling fluid circuits which are independent of each other.

FIG. 3 diagrammatically illustrates a device according to the invention in which in the cooling fluid circuit there is provided a pressure measuring device with an electric pick-up the voltage of which is through the intervention of a bridge circuit compared with the voltage of a speed-dependent driven generator.

Figure 3:
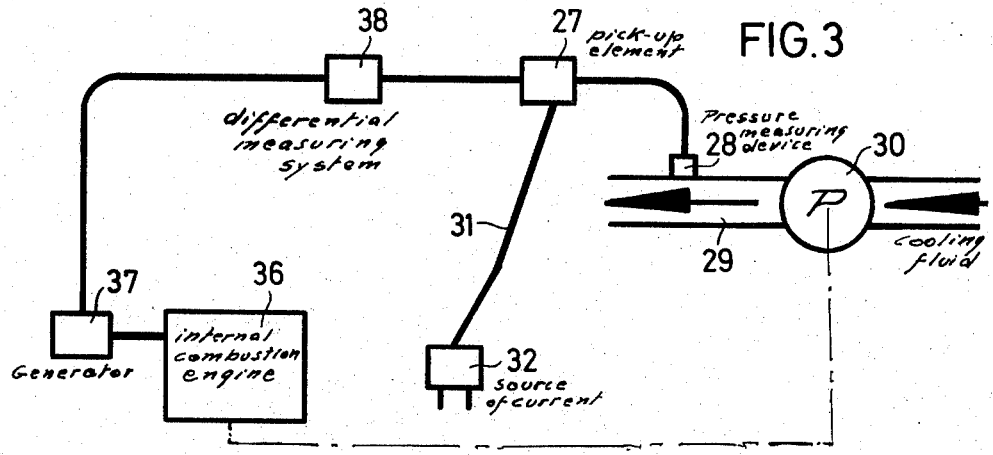

The device according to the present invention is characterized primarily in that the speed-dependent factor in cooperation with a further independent speed-dependent factor of a similar characteristic brings about the actuation of a differential measuring system.

With the device according to the present invention the operating level or operating point of the factor to be checked and controlled is continuously compared with the operating level or operating point of an independent factor which has a characteristic similar to the operating characteristic. If the difference between the factors to be compared with each other exceeds a given rated value, this difference can be read on a measuring device or can be used for automatically actuating an alarm system.

By means of the device according to the invention, at the same time two factors which are independent of each other may be checked and controlled because it is improbable that two auxiliary units which are independent of each other will at the same time show faults which would neutralize each other as to the result. Thus, according to one embodiment of the invention, for instance, with two cooling water pumps for two separate cooling water circuits it is advantageous that the cooling fluid pressure of one cooling fluid circuit together with the cooling fluid pressure of the other cooling fluid circuit actuates a differential measuring system.

If the installation to be checked and controlled does not have two factors which are independent of each other and have a similar characteristic, it may be advantageous according to a further development of the invention to have a simulating or model device furnish the second speed-dependent factor. Such model device may have smaller dimensions and may be of a simpler construction than the unit to be checked. Thus, for instance, a cooling fluid pump may together with a small model or simulator pump actuate a differential measuring system.

It is, by no means, necessary that the lines of characteristic of the factors to be compared with each other are identical. It rather suffices when these lines of characteristic are approximately parallel to each other within tolerances to be maintained. According to a further development of the invention it is suggested that the pressure of a cooling fluid circuit together with the pressure in the suction line of an internal combustion engine actuates a differential measuring system.

Instead of employing the pressure of a system, also other factors may be used for checking purposes. Thus, according to a further embodiment of the invention, it is suggested that restricting means be provided in two cooling fluid circuits, the differential pressure of which restricting means indicates the quantity of the throughflow, to actuate the differential measuring system. Similarly, it would be possible in the cooling fluid circuits to be compared with each other to provide throughflow meters coupled with a generator while the comparison of the voltage is effected by a bridge circuit.

If there is only one cooling fluid circuit present, it is possible according to a further development of the invention, in this cooling fluid circuit to provide a throughflow meter coupled to a generator the voltage of which is then compared by a bridge circuit with a speed-dependent driven generator. In order to prevent flow losses in the cooling fluid circuit, it is advantageous to arrange the throughflow meters in a bypass line.

According to a further development of the invention, instead of throughflow meters, also pressure measuring devices with electric pick-up may be provided. The comparison of the voltage may in this instance likewise be effected by means of a bridge circuit.

Referring now to the drawings in detail, a cylinder head 1 of a supercharged reciprocable piston internal combustion engine has an inlet passage 2 and an outlet passage 3 which are controlled by spring-loaded valves 4 and 5 respectively. The inlet passage 2 is through a connecting line 6 connected to a differential measuring system 7 which comprises a cylinder 8, a double-acting piston 9 and indicating or alarm means 11 which is connected to the piston 9 by a piston rod 10. The double-acting piston 9 is axially displaceable in the cylinder 8 and is normally held in its intermediate position by springs 12. One end face 13 of the double-acting piston 9 is acted upon by the pressure in the suction line 2 whereas the other end face 14 communicates through a connecting line 15 with a cooling fluid circuit 16 comprising a pump 17. Arranged in parallel to pump 17 is a short-circuit line 18 with a variable choke 19 through which the pressure characteristic of pump 17 can be adapted to the respective device.

FIG. 2 shows another embodiment of the invention, in which the elements having the same functions as the elements shown in FIG. 1 have been designated with the same reference numerals as in FIG. 1. The device of FIG. 2 differs from the device of FIG. 1 in that the differential measuring system, instead of being actuated by the pressure in suction line 2 of the internal combustion engine, is actuated by the pressure of a further cooling fluid circuit 20. The corresponding pump is designated with the reference numeral 21 whereas its short-circuit line is designated with the reference numeral 22, and the variable choke is designated with the reference numeral 23. Instead of the double piston 9 there is provided a single piston 24 one end face 25 of which is actuated by the pressure of the cooling fluid circuit 16 whereas the other end face 26 is actuated by the pressure of the cooling fluid circuit 20.

The operation of the two devices illustrated in FIGS. 1 and 2 is as follows: With increasing speed of the internal combustion engine, the pressure drops in the inlet passage 2 whereas the pressure in the cooling fluid circuit 16 rises. By suitable transmission means, for instance, by stepping the effective surface of the piston 9, it is possible to realize that at normal operation the piston will within given tolerances remain in its intermediate position. If, however, the pressure in the cooling fluid circuit is lowered relative to the respective speed, piston 9 will move downwardly and, when reaching a value below the limit value admissible for the respective operating point, will through the warning device 11 initiate an alarm. This alarm may in the manner required by the bureaus of standard be effected in three stages.

Similar results are obtained with the device of FIG. 2 when the pressure drops in the cooling fluid circuit 20. If, however, the pressure drops in the cooling fluid circuit 16, piston 9 moves in the opposite direction and through the warning device 11 an alarm is initiated in the same manner for the cooling fluid circuit 16.

According to the device illustrated in FIG. 3, a generator 37 is driven by an internal combustion engine 36. The voltage of the generator 37 is by means of a differential measuring system 38 of the type of a bridge circuit compared with the voltage of a pressure measuring device 28. This device 28 is connected to a cooling fluid circuit 29 comprising a pump 30. The electric pick-up or primary element 27 is through a conductor 31 connected with a source of current 32. When the pressure in the cooling fluid circuit 29 drops below the limit value admissible for the respective operating point, the inadmissible voltage deviation of the electric pick-up 27 will through the differential measuring system 38 initiate an alarm.

Figure 4:
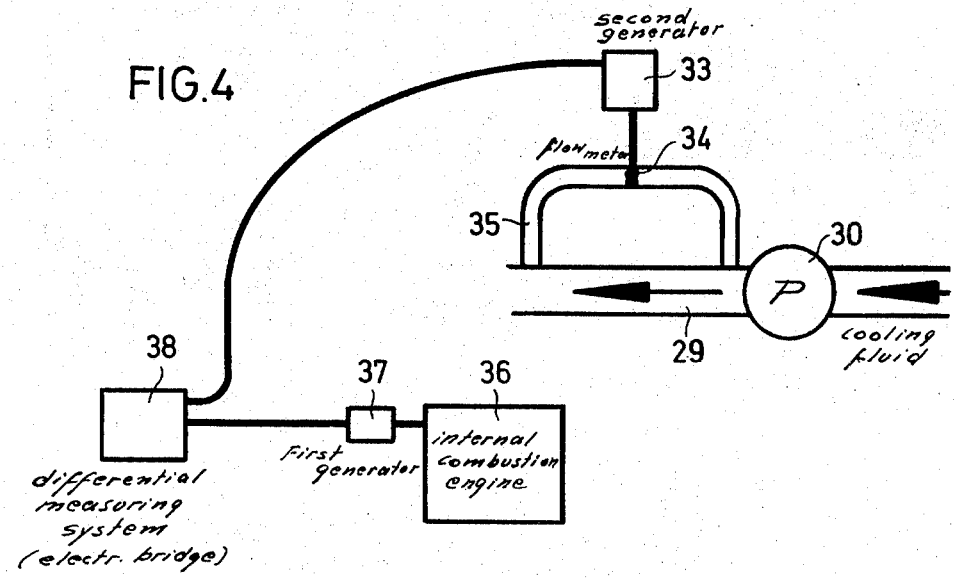
FIG. 4 is a diagrammatic showing of a device according to the invention in which a flow meter is arranged in a bypass line of a cooling fluid circuit.

FIG. 4 shows a device according to the invention in which the elements having the same function as the elements shown in the embodiment of FIG. 3 are designated with the same reference numerals as in FIG. 3. According to FIG. 4, however, the electric pick-up 27 is replaced by a second generator 33 which is coupled to a flow meter 34 which latter is located in a bypass line 35 of the cooling fluid circuit 29. Changes in the throughflow in by-pass line 35 which do not correspond to an increase or drop in the speed of the internal combustion engine 36 will in the differential measuring system 38 bring about voltage differences which in turn will lead to the initiation of an alarm.

Figure 5:
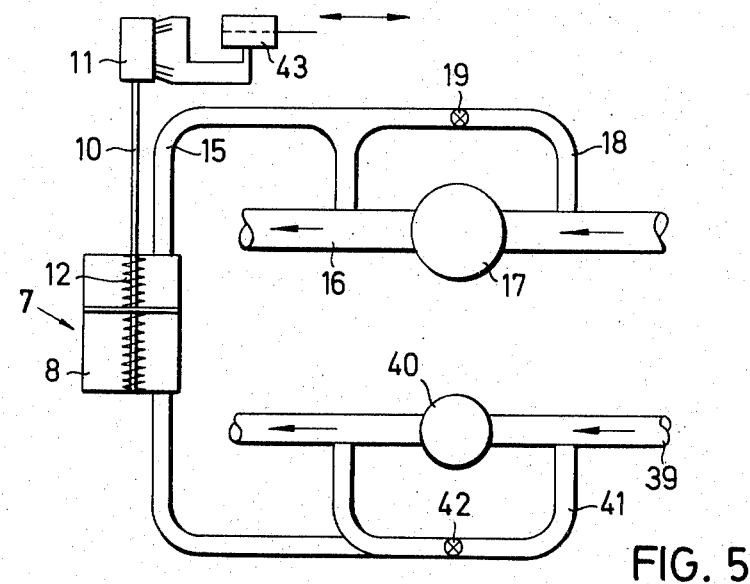
FIG. 5 is a diagrammatic illustration of a device equipped to stop operation of working circuits in response to a settable rated value being realized.

FIG. 5 shows a cooling means circuit 16 in which a pump 17 is provided. Parallel to the pump 17 a short-circuit line 18 with a variable choke 19 is arranged through which the pressure characteristic of the pump 17 can be adapted to the respective device. The short-circuit line 18 is connected by way of a connecting line 15 with the inlet of the differential measuring system 7. The second inlet of the differential measuring system 7 is connected with a short-circuit line 41 in which a variable throttle or choke 42 is provided. The short-circuit line extends parallel to a matching or model pump 40 which is provided in a model cooling means circuit 39. The model or matching pump 40 can be kept smaller than the pump 17. The differential measuring system 7 is connected with a warning device 11 from which a shut-off device 43 for instance in the form of a solenoid becomes actuated.

Figure 6:
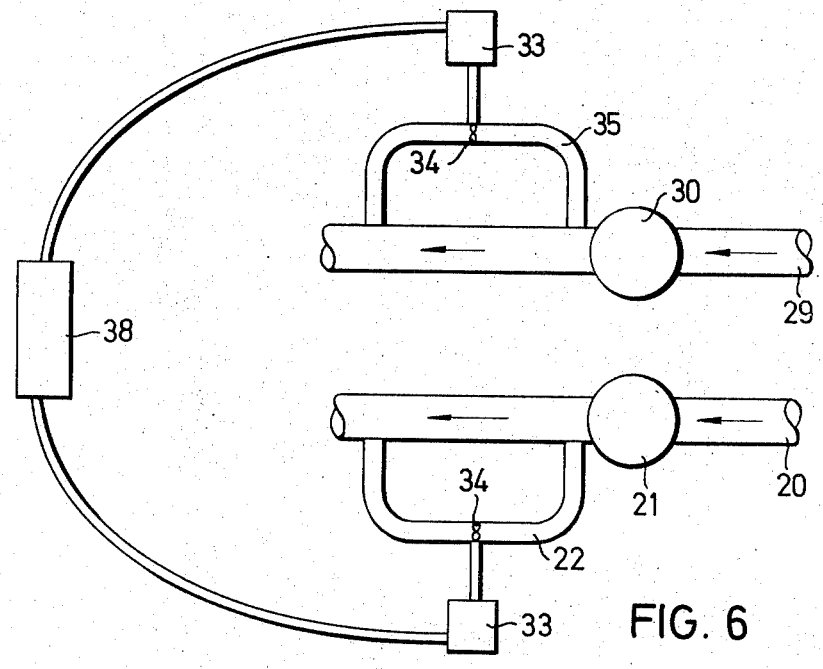
FIG. 6 illustrates an arrangement similar to that of FIG. 2 but smaller.

FIG. 6 shows an arrangement smaller than that of FIG. 2 though in place of the pressure differential measuring system 7 there is substituted an electrical differential measuring system in the form of a bridge connection 38 of which the input terminals are connected with generators 33 driven by through-flow measuring means 34 joined with two cooling means circuits 29 and 20.

It is, of course, to be understood that the present invention is, by no means, limited to the particular showing in the drawings, but also comprises any modifications within the scope of the appended claims.

What we claim is:

1. In combination with a first working circuit having a speed-dependent factor which has to be checked continuously, a second working circuit having a speed-dependent factor of a characteristic similar to the characteristic of the speed-dependent factor to be checked continuously, and a differential measuring system operatively connected to said first and second circuits and operable to indicate a difference in excess of a permissible difference in the conditions of operation of said two circuits, said first and second working circuits being cooling fluid circuits, each of said cooling fluid circuits being independent of the other and including a cooling water pump and conduit means respectively leading from said cooling water circuits to different areas of said differential measuring system to convey fluid pressure thereto for actuating said differential system in response to a non-permissible condition of operation in the circuit the speed-dependent factor of which is to be checked continuously.

2. A combination according to claim 1, in which one of said working circuits includes a simulator.

3. A combination according to claim 1, in which one of said circuits includes a cooling water pump and the other circuit includes a considerably smaller model pump.

4. A combination according to claim 1, in which said first working circuit includes an internal combustion engine having an intake manifold, and in which said second working circuit includes a cooling fluid circuit under pressure, and separate conduit means respectively connecting said intake manifold and said cooling water circuit with different areas of said differential measuring system.

5. A combination according to claim 1, which includes constricting means respectively inserted in said cooling fluid circuits.

6. A combination according to claim 1, which includes through-flow meter means respectively arranged in said circuits, generator means having said flow meters coupled thereto, said differential measuring system including a bridge circuit, and conductor means respectively leading from said generator means to said bridge circuit.

7. A combination according to claim 1, in which said first working circuit includes an internal combustion engine and a generator drivingly connected thereto, and in which said second working circuit includes a cooling fluid circuit with a fluid pump drivingly connected to said internal combustion engine, said cooling fluid circuit also including a pressure measuring device having an electric pick-up associated with said pressure measuring device, a source of current electrically connected to said pick-up, and a differential measuring system electrically connected to said generator and said pick-up and operable to compare the voltage at said generator with the voltage of said pick-up.

8. A combination according to claim 1, in which said first working circuit includes an internal combustion engine and a first generator drivingly connected thereto; and in which said second working circuit includes a pressure fluid cooling system with a flow meter, and a second generator coupled to said flow meter; and a bridge circuit means electrically connected to said first and second generator means for comparing their voltages with each other.

9. A combination according to claim 8, in which said pressure fluid cooling system includes a pressure fluid by-pass line having said flow meter arranged therein.

10. A combination according to claim 1, in which said differential measuring system includes means operable in response to a settable rated value being realized to give off a warning signal.

11. A combination according to claim 1, in which said differential measuring system includes means operable in response to a settable rated value being realized to stop operation of said working circuits.

* * * * *

UNITED STATES PATENT OFFICE
CERTIFICATE OF CORRECTION

Patent No. 3,817,224  Dated June 18, 1974

Inventor(s) Heinz Pluequet et al.

It is certified that error appears in the above-identified patent and that said Letters Patent are hereby corrected as shown below:

On the cover sheet the assignee should read

-- Klockner-Humboldt-Deutz --.

Signed and sealed this 1st day of October 1974.

(SEAL)
Attest:

McCOY M. GIBSON JR.  
Attesting Officer

C. MARSHALL DANN  
Commissioner of Patents